July 16, 1957 W. W. JUSTICE ET AL 2,799,571
METHOD OF UTILIZING BLAST-FURNACE FLUE-DUST OR THE LIKE
Filed Sept. 10, 1954 2 Sheets-Sheet 1
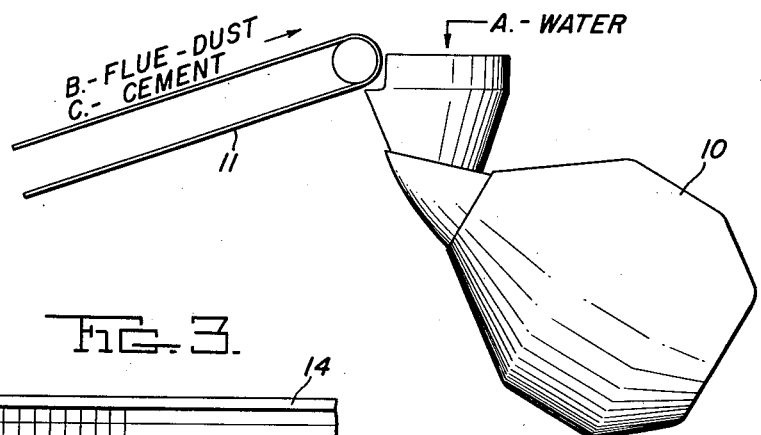
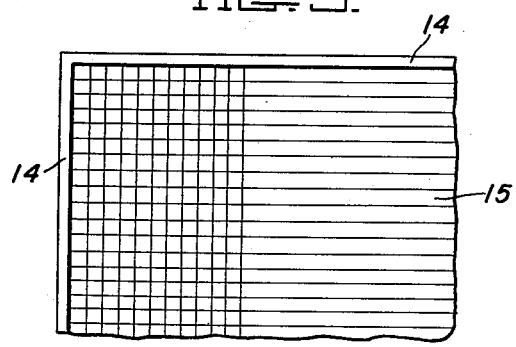
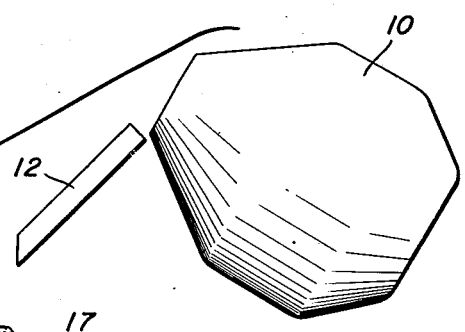
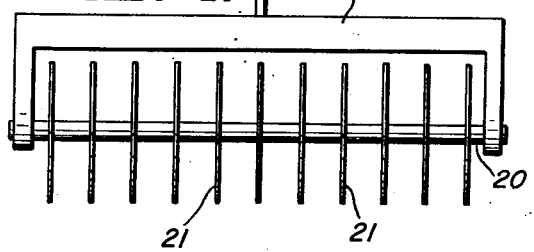
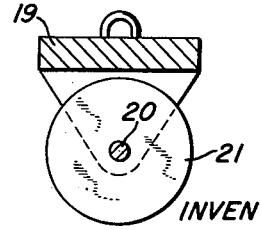
INVENTORS:
WILLIAM W. JUSTICE and
CHARLES R. SANDS,
BY: Donald G. Dalton
their Attorney.

United States Patent Office 2,799,571
Patented July 16, 1957

2,799,571

METHOD OF UTILIZING BLAST-FURNACE FLUE-DUST OR THE LIKE

William W. Justice, Poland, and Charles R. Sands, Youngstown, Ohio, assignors to United States Steel Corporation, a corporation of New Jersey Application September 10, 1954, Serial No. 455,302

5 Claims. (Cl. 75—3)

This invention relates to a process for converting blast-furnace dust into usable form.

The dust and fines carried over from the stack of a blast-furnace accumulate in the dust catcher, gas washer and flues and are periodically removed therefrom. The only practical mode of utilizing the dust heretofore has been by sintering. Sintering is an expensive operation, however, because of the high cost of the plant required for a substantial output capacity. As a result, flue-dust, for the most part, has simply been dumped as waste on any available vacant land and vast amounts thereof are found adjacent all blast-furnace installations. Flue-dust contains around 50% iron and the available quantities of dust represent a tremendous potential reserve of metal but the lack of a cheap method of converting it into a form suitable for charging into a smelting or refining furnace has so far prevented recovery thereof except for the relatively small amount used as sinter feed.

We have invented a novel process for consolidating flue-dust into large lumps or blocks having sufficient strength to prevent serious degradation on handling and therefore well suited for charging into a blast-furnace or open-hearth furnace in lieu of a portion of the ore charged. Stated generally, our process involves making a thick slurry of flue-dust, hydraulic cement and water, casting the slurry into a thick slab, then after the mix has set, breaking up the slab into lumps and charging them into a furnace along with the other components of a normal charge. We have also developed an exceedingly cheap way of carrying out the process, using a minimum of conventional apparatus which is readily available and is specially adapted for handling large quantities of material at low cost.

More particularly, we mix flue-dust with small amounts of hydraulic cement and water, to produce a thick slurry. We then dump the slurry on the ground and smooth it between form walls so as to make a thick slab. After partial setting of the cast mix, we score it into blocks of suitable size for charging into a furnace. On completion of the setting or aging of the mix, we break up the slab into blocks and deliver them to the furnace for charging as needed in lieu of a portion of the ore normally used.

A complete understanding of the invention may be obtained from the following detailed description of a preferred practice thereof, as represented by a typical example used for the purpose of illustration, with reference to the accompanying drawings showing diagrammatically the several steps and the apparatus used therein. In the drawings:

Figure 1 shows the charging of the water, flue-dust and cement into the rotary drum of a truck-mounted mixer;

Figure 2 shows the casting of the resulting plastic mix;

Figure 3 is a partial plan view of a cast slab after scoring;

Figure 4 is an elevation of a gang-cutter scoring device;

Figure 5 is a cross-section therethrough;

Figure 6:
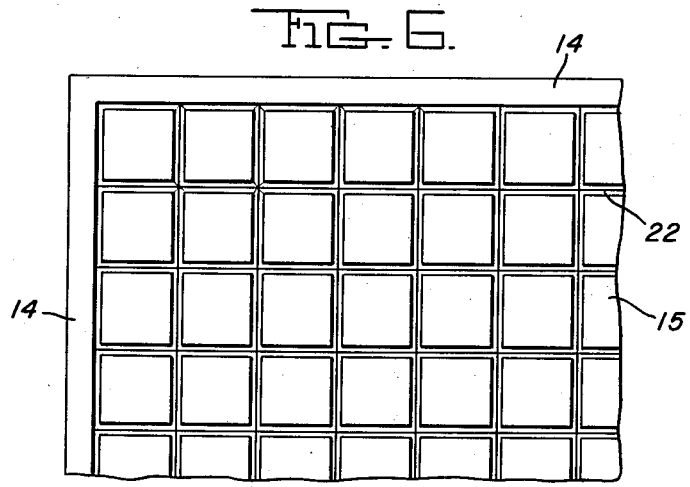
Figure 6 is a portion of Figure 3 to enlarged scale showing the opening up of the scores after shrinkage in aging.
Figure 7:
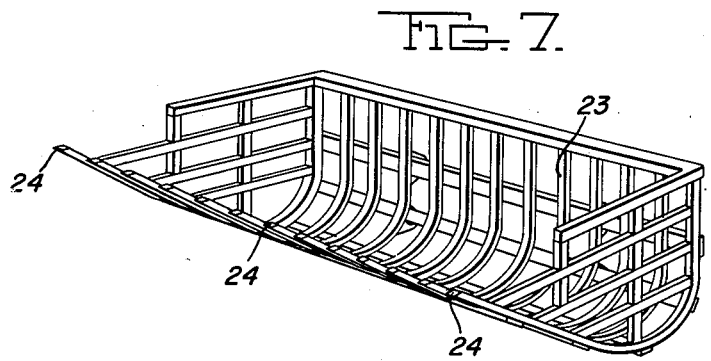
Figure 7 is a perspective view of a grid-like scoop used to gather the hardened blocks.

For the mixing of the flue-dust, cement and water, we preferably employ a conventional truck mixer having a rotary drum 10. We first run a quanity of water into the mixer drum and then add thereto gradually the dust and cement. A belt conveyor 11 of the portable-boom type may conveniently be placed adjacent a pile of accumulated dust and the truck backed under the discharge end of the conveyor. A power shovel is preferably used to load dust from the pile onto the conveyor. It is important to add the dust and cement to the water rather than the reverse, in order to facilitate mixing. The mixer is operated while the dust and cement are being added, to afford a progressive mixing action, and for as long thereafter as required to produce a uniform composition.

In the example under consideration, 1460 lbs. of water was supplied to the drum of a mixer of 8 cu. yd. capacity. To this volume of water was added gradually, while the mixer drum was revolved, 17,000 lbs. of flue-dust and 1040 lbs. of Portland cement. An addition of 22 lbs. of calcium chloride (2 lb. per 94-lb. sack of cement) was also made to the mix in order to accelerate setting thereof. Mixing of the materials was continued for 10 or 15 minutes to produce thorough blending and insure uniform composition and proper consistency. The amounts of the several ingredients specified, when thoroughly mixed, result in a thick slurry or mud which can be poured or cast but slumps only to a limited degree when piled.

The amount of water used may vary from 1200 to 1700 lbs. depending on the moisture content of the dust. The amount of cement may likewise vary from 750 to 1500 lbs. depending on the moisture content of the dust, the atmospheric temperature and the crushing strength desired in the final product. On a percentage basis, the mix is preferably composed of from 4 to 8% cement and 6 to 9% water by weight, the balance being substantially all flue-dust. If the amount of cement used is reduced below 4% the strength of the product will not be sufficient to make it satisfactory for blast-furnace charge. Increasing the amount of cement above 8% unnecessarily increases the cost of the process. The amount of calcium chloride or other accelerator, if used, varies with the amount of cement, being about 2% of the weight thereof, which is so small as to have no significant effect on the percentages of the other ingredients.

The mix made as described above is dumped from the mixer 10 through a chute 12 onto a substantially level bed 13 between confining flash-boards or form walls 14 and spread out to form a rough slab 15 about 8" thick. The mix may be cast on any suitable surface but we prefer to dump it on a bed of earthy material, such as afforded by any level piece of ground, for ease of removal. A casting area from 50 to 80 feet by 80 to 100 feet, for example, is graded if necessary, and a layer of flue-dust 16 deposited thereon and spread to a substantially uniform depth of about 6". The flue-dust layer constitutes a spacer or cushion between the ground and the cast slab of plastic mix. The flue-dust layer is preferably covered with a separator sheet 17 such as that formed by unrolling strips of kraft paper side-by-side with their side edges overlapping. The separator sheet prevents the cast slab 15 from adhering to the dust particles forming the cushion on the casting bed.

The mix may readily be cast by driving the mixer over the bed prepared as explained above and revolving the drum to dump the contents thereof in piles at spaced points. The piles are then spread by hand using hoes or other suitable tools, to form a slab of substantially uniform thickness, i. e., about 8". Setting of the slab is allowed to proceed to an intermediate stage such that it will not run together and rebond when scored or cut through. This will take from about a half hour at summer temperatures to two hours at temperatures near freezing. The slab is then scored substantially throughout its depth along longitudinal and transverse parallel lines about 6" apart, as shown in Figure 3. This scoring may easily be done by drawing a weighted gang-disc cutter 18 (Figures 4 and 5) along and across the slab with the boom of a traveling crane. The cutter comprises a heavy frame 19 having a shaft 20 journaled therein provided with spaced discs 21.

After scoring the slab, further setting or aging thereof is allowed to proceed substantially to completion which takes from 6 to 8 hours if an accelerator has been used. As setting progresses, shrinkage of the blocks formed by scoring will occur causing actual separation along the score lines as shown at 22 in Figure 6, so that they may be broken apart readily. When fully set, the blocks have sufficient crushing strength, i. e., from 400 to 800 p. s. i., to permit handling without excessive breakage or degradation. We use a tractor-mounted high-lift provided with a grid-like scoop or basket 23 of which the bottom, side and ends are composed of gratings. The bottom of the scoop has forwardly projecting teeth 24 adapted to enter under the edge of the slab and scrape up successive loads thereof, thereby breaking the blocks apart along the scored lines. The high-lift then dumps the blocks into trucks or cars for transport to a blast-furnace for use in the same manner as iron ore. Any fines or small fragments pass through the spaces between the bars of the scoop and are left behind.

We have found that blocks or lumps of flue-dust consolidated by the method of our invention may be charged as part of the blast-furnace burden up to about one-fourth of the amount of ore ordinarily charged, with satisfactory results. It may also be used in the open-hearth furnace in lieu of charge ore or feed ore. In the latter case, the consolidated flue-dust is mixed in equal proportions with ore. Our method may also be employed for the consolidation of ore fines instead of flue-dust or a portion of ore fines may be used instead of a portion of the flue-dust.

Our method has several important advantages. In the first place, it is inexpensive since it may be carried on outdoors adjacent the dust pile with a minimum of simple equipment and labor. The equipment used is practically all standard and easily obtainable. No fixed machinery or building is necessary. The capacity of a given operation can therefore be quickly expanded or contracted in accordance with the need for the product since the mixer, conveyor and high-lift may be used for other purposes. Thus it is not necessary to have unused equipment standing idle when the demand is low. The principal advantage of the invention, of course, is that it makes it economically feasible to recover the iron contained in the large quantities of flue-dust accumulated at every blast-furnace and heretofore considered as waste except for the relatively small amount which has been sintered.

Although we have disclosed herein the preferred practice of our invention, we intend to cover as well any changes and modifications thereof which are within the principle of the invention and the scope of the appended claims.

We claim:

1. A method of converting blast-furnace flue-dust into usable form, consisting of gradually churning about 87 parts dust and about 5 parts hydraulic cement into about 7 parts water, all proportions by weight, casting the resuting mix to slab-forming thickness on an earthy bed covered with fibrous sheet material, scoring the slab before the mix has fully set, allowing the slab to age and breaking the slab into blocks adapted for use in a metallurgical furnace in lieu of iron ore.

2. A method according to claim 1, characterized by gathering the blocks from the bed in a reticulated scoop.

3. A method of converting blast-furnace flue dust into usable form which consists in first preparing a casting bed of earthy material, covering the bed with fibrous sheet material, casting on the sheet material a mixture of flue dust with 4 to 8% of hydraulic cement and 6 to 9% water, by weight, to a slab-forming depth, and, after setting of the cast mixture to slab form, fragmenting it into lumps suitable for furnace charge.

4. A method according to claim 3 characterized by scoring the slab before fragmenting and gathering the lumps from the bed in a reticulated scoop.

5. A method according to claim 3 characterized by covering said bed with a layer of flue dust before applying the fibrous sheet material.

References Cited in the file of this patent

UNITED STATES PATENTS

| | | |
|---|---|---|
| 1,175,933 | Dery | Mar. 21, 1916 |
| 1,994,378 | Williams et al. | Mar. 12, 1935 |
| 2,134,103 | Collord | Oct. 25, 1938 |
| 2,486,388 | Brinton | Nov. 1, 1949 |